United States Patent

[11] 3,574,258

| [72] | Inventors | Charles W. May;<br>Franklin A. Porter, Indianapolis; John W. Pickett, Fort Wayne, Ind. |
|---|---|---|
| [21] | Appl. No. | 791,270 |
| [22] | Filed | Jan. 15, 1969 |
| [45] | Patented | Apr. 13, 1971 |
| [73] | Assignee | The United States of America as represented by the Secretary of the Navy |

[54] METHOD OF MAKING A TRANSREFLECTOR FOR AN ANTENNA
1 Claim, 8 Drawing Figs.

[52] U.S. Cl. ..................................................... 29/600, 343/909
[51] Int. Cl. ..................................................... H01p 11/00, H01q 13/00
[50] Field of Search .......................................... 343/756, 909; 29/600

[56] References Cited
UNITED STATES PATENTS

| 2,790,169 | 4/1957 | Sichak | 343/756 |
| 2,930,039 | 3/1960 | Ruze | 343/909 |
| 2,948,896 | 8/1960 | Hart | 343/873 |

*Primary Examiner*—John F. Campbell
*Assistant Examiner*—D. M. Heist
*Attorneys*—Edgar J. Brower, H. H. Losche and Paul S. Collignon ABSTRACT: A method of making a transreflector for an antenna comprising first preparing a grating of equally spaced parallel wires, and then attaching said gating to a flat sheet of plastic material. The sheet of plastic material is then shaped into a segment of a right circular cone having a parabolic end surface on which the spaced parallel wires are positioned, by use of a heated-vacuum die. The formed sheet of plastic material is then attached to a metallic mounting ring.

INVENTORS
CHARLES W. MAY
JOHN W. PICKETT
FRANKLIN A. PORTER

BY H. H. Loeche
Paul G. Collignon

ATTORNEYS

3,574,258

METHOD OF MAKING A TRANSREFLECTOR FOR AN ANTENNA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In recent years, double-reflector antennas, commonly called Cassegrain antennas, have been employed in a wide variety of radar and other microwave antennas. Cassegrain antennas consist of a main disc, which is usually a paraboloid, and an auxiliary reflector, or subdisc, which might be either a hyperboloid subdisc or a concave paraboloidal subdisc. In one form of polarization-twisting Cassegrain system the main disc is flat and the subdisc is a concave paraboloid with all of the focusing being accomplished by the paraboloid thereby permitting the flat reflector to be tilted without destroying the collimation properties of the assembly.

One limitation of Cassegrain antennas is the blocking of the main aperture by the subdisc. The presence of an opaque subdisc in the main aperture of the antenna creates a "hole" in the illumination which causes decreased gain and increased sidelobe levels. In order to minimize blocking, a polarization-twisting technique is frequently employed which avoids subdisc shadowing. The subdisc comprises a horizontal grating, called a transreflector, which reflects a horizontally-polarized wave radiated by the feed. The main disc incorporates a surface design called a twistreflector, which twists the horizontally-polarized wave to a vertically-polarized one as it reflects the wave back. The portion of this wave which is now incident on the subdisc is transmitted through unaffected because the subdisc is transparent to a vertically-polarized wave. Thus there is no blocking by the subdisc.

In one design of the transreflector, a grating of thin wires is provided and these are closely spaced compared with a wavelength. This grating serves as essentially a perfect reflector for parallel polarization while being essentially invisible to perpendicular polarization. For the twistreflector design, a grating of metal wires oriented at 45 degrees to the incident polarization may be placed in front of a reflecting surface.

SUMMARY OF THE INVENTION

The present invention relates to a method of making a transreflector which reflects a vertically-polarized wave, but which passes a horizontally-polarized wave. A grating of equally-spaced parallel wires is first prepared by winding wire on a mandrel having an ellipse opening. The wire spacing is controlled by the feed speed of the lathe carriage from which the wire is fed to the rotating mandrel. The wire grating is cutaway from the mandrel in the shape of the ellipse opening in the mandrel, and the ellipse-shaped grating is attached by cementing to a flat sheet of plastic. This sheet of plastic is then formed by a die into a tapered cone section having a parabolic end. The formed plastic is then trimmed and attached to a metallic mounting ring.

It is therefore a general object of the present invention to provide an improved method of making a transreflector which reflects vertically-polarized waves but which will pass horizontally-polarized waves.

Other objects and advantages of the present invention will be readily appreciated as the same becomes better understood by reference to the following detailed description when considered in connection with the accompanying drawing.

DESCRIPTION OF THE PREFERRED EMBODIMENT

Figure 1:
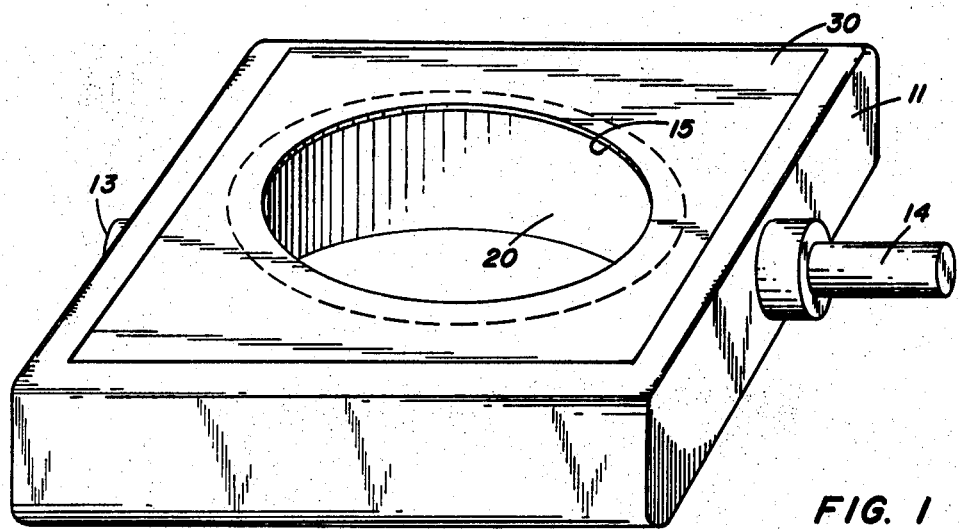
FIG. 1 is a perspective view of a mandrel for winding a wire grating.
Figure 2:
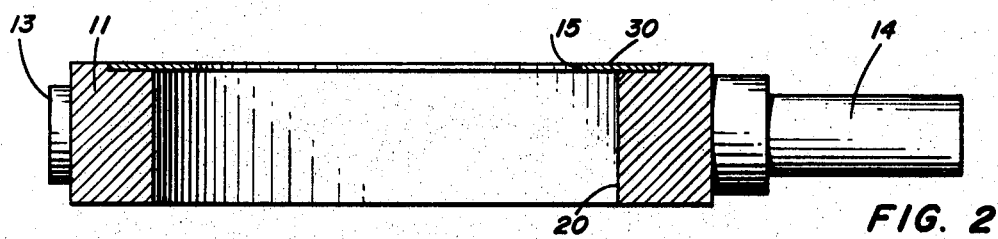
FIG. 2 is a longitudinal sectional view of the mandrel shown in FIG. 1.

Referring now to the drawings, there is shown in FIGS. 1 and 2, a mandrel 11 for use in preparing a wire grating 12. Mandrel 11 is provided with a hub 13 and shaft 14 to facilitate mounting mandrel 11 in a chuck and tailstock, respectively, of a lathe. Mandrel 11 is provided with an elliptical hole 15, with the major axes of the ellipse being oriented parallel to the direction on which wire is to be wound on mandrel 12. In order to facilitate the manufacture of mandrel 11, an enlarged hole 20 is provided in mandrel 11, and a plate 30 having elliptical hole 15 is attached to one flat surface. It can be seen in FIGS. 1 and 2 of the drawings, that the diameter of hole 20 is greater than the major axes of elliptical hole 15. It should be understood, of course, then elliptical hole 15 might also be cut directly in mandrel 11.

Figure 3:
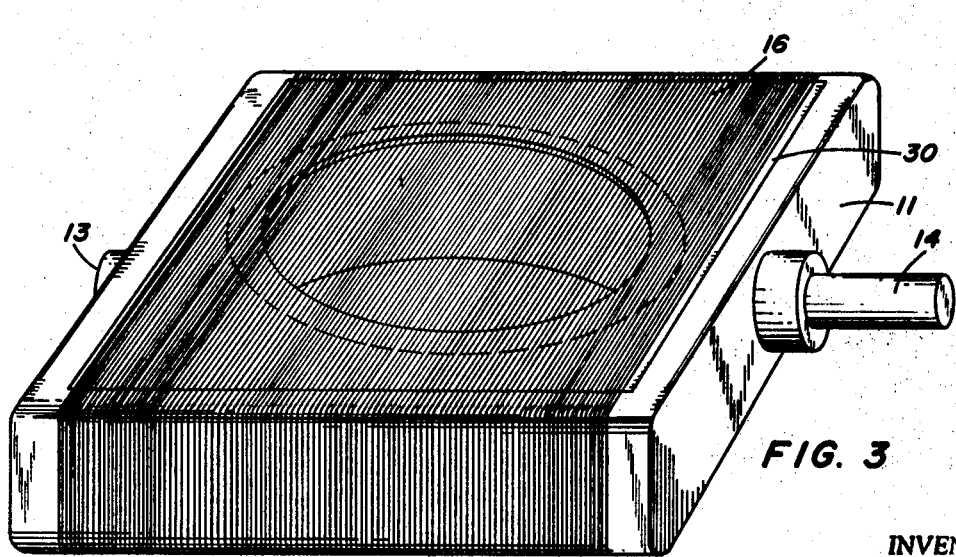
FIG. 3 is a perspective view showing wire wound upon a mandrel.

FIG. 3 of the drawing shows wire 16, such as copper wire, wound upon mandrel 11 with the wire spacing being controlled by the feed speed of the lathe carriage from which the wire is fed onto the rotating mandrel. By way of example, wire 16 might be 0.006 inch in diameter and the spacing between adjacent wires might be 0.008 inch. It should be understood, of course, that the wire size and spacing between adjacent wires is chosen with relation to the desired frequency of the transmitted signal. This relationship is discussed in the text, Microwave Antenna Theory and Design, by Silver, McGraw-Hill Book Company, Inc., 1949, on pages 449—450. In order to facilitate holding wire 16 in position on mandrel 11, strips of tape having adhesive on both sides can be attached to mandrel 11.

Figure 4:
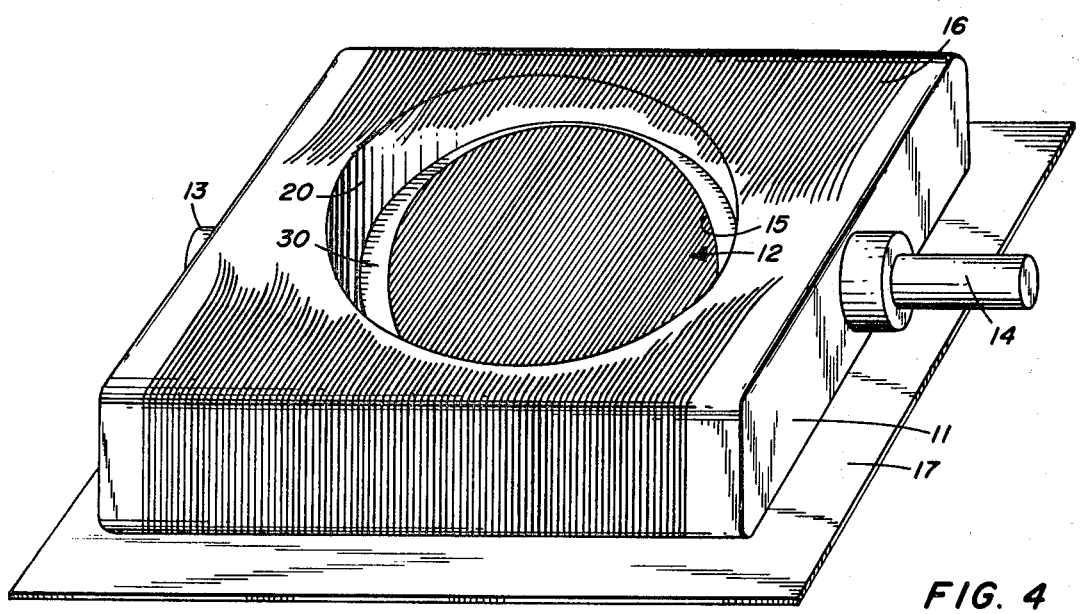
FIG. 4 is a perspective view showing a wire-wound mandrel positioned on a sheet of plastic.

After enough wire 16 has been wound on mandrel 11 to cover elliptical hole 15, mandrel 11 is removed from the lathe and then positioned onto a sheet of flat plastic material 17. Upon winding of wire 16 onto mandrel 11, two gratings of wire are formed, however, as best shown in FIG. 4 of the drawings, the top grating is severed, thereby exposing the other grating 12 through elliptical hole 15. Next, an adhesive cement material is sprayed through hole 15 thereby causing grating 12 to become attached to the sheet of flat plastic material 17, upon the drying of the adhesive cement. By way of example, plastic material 17 might be polysulfone and a cement might be prepared by dissolving shavings of polysulfone in ethylene dichloride in the ration, by weight, of 1 part polysulfone to 19 parts of ethylene dichloride. It should be understood, of course, that other plastic materials and other adhesives will work equally as well.

Figure 5:
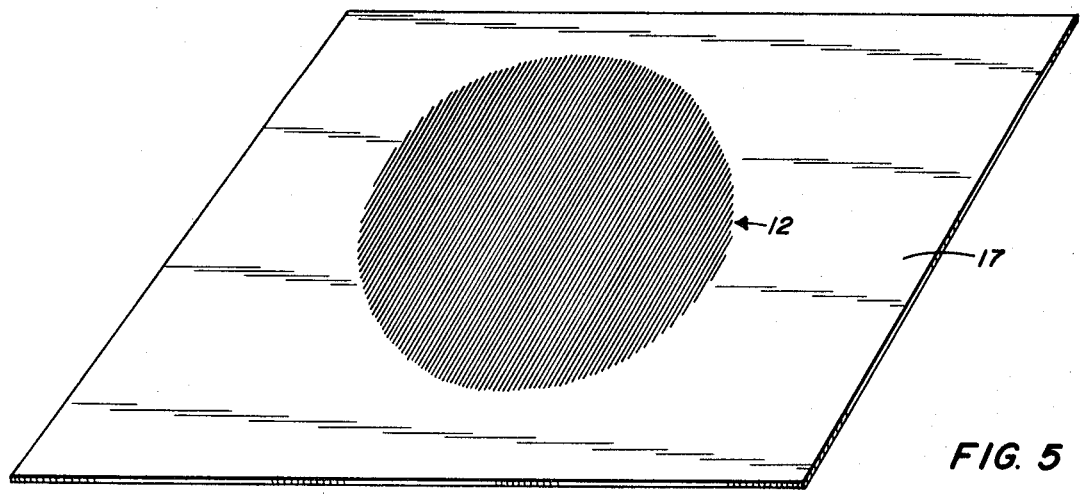
FIG. 5 is a perspective view showing a sheet of plastic having a wire grating attached thereto.

After the adhesive has dried, a knife tool is inserted in elliptical hole 15 and cuts a pattern as outlined by the shape of elliptical hole 15. Mandrel 11 is then removed, along with the scrap pieces of wire and there remains a wiring grating 12 which is elliptical in shape, as shown in FIG. 5 of the drawings.

Figure 6:
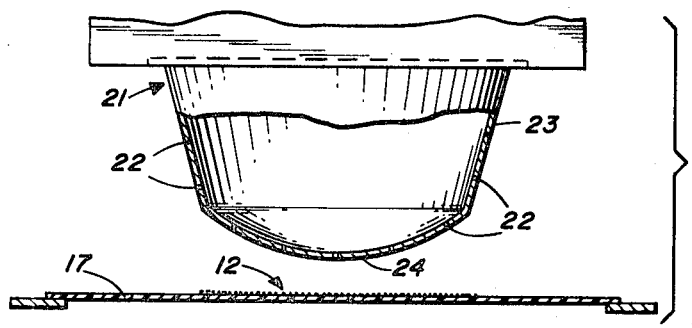
FIG. 6 is a side view, partly in section, showing a die of molding machine.
Figure 7:
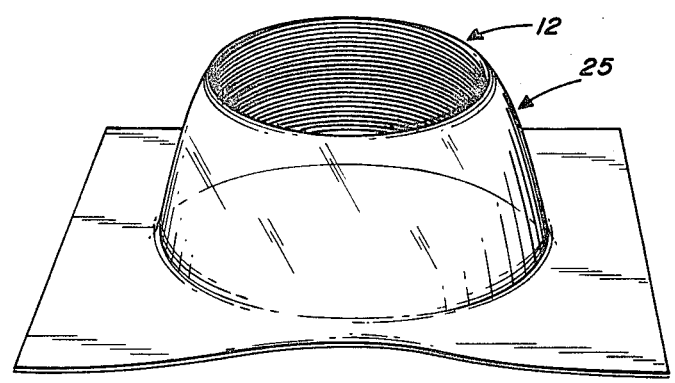
FIG. 7 is a perspective view of a molded transreflector prior to trimming excess plastic material.
Figure 8:
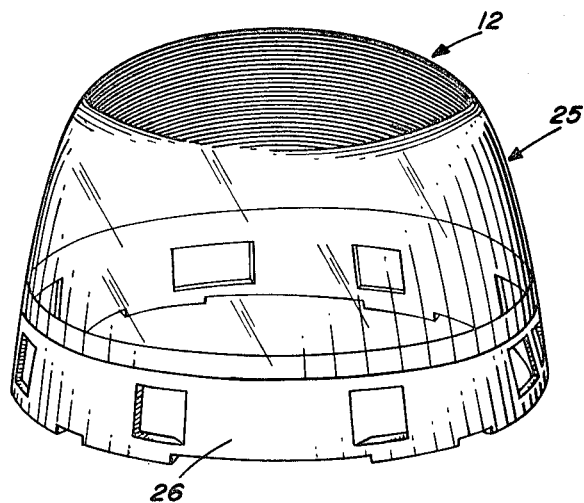
FIG. 8 is a perspective view of a transreflector attached to a mounting ring.

The next step is to shape the sheet of plastic 17 with wire grating 12 thereon into a transreflector having a parabolic end surface. By way of example, a mold 21 might be provided which is a hollow shell and which has a plurality of holes 22 penetrating the wall so that a vacuum can be provided to help shape the plastic. Mold 21 is preferably preheated to about 185° F., and also the sheet of plastic is heated to a temperature so that is becomes soft and begins to droop. Mold 21 is forced downward into the plastic sheet of material 17, and then a partial vacuum is created in mold 21 so that the sheet of material 17 conforms to the outer surface configuration of mold 21. As best shown in FIG. 6 of the drawing, mold 21 has tapered sidewalls 23 and a parabolic end surface 24. After sheet 17 conforms to shape of mold 21, cooling air is blown onto the molded part 25 for about 5 minutes, and then the vacuum is replaced by air pressure which assists in the removal of molded part 25 from mold 21. FIG. 7 of the drawings shows molded part 25 after removal from the mold, and the part is then trimmed and attached to a metallic ring 26, as shown in FIG. 8 of the drawing. By way of example, molded part 25 might be attached to ring 26 by an epoxy type cement. Mounting ring 26 provides a means for mounting the transreflector to the antenna system bulkhead and holds the parabolic surface, with grating 12 thereon, rigid and in proper orientation with the twistreflector and R. F. feed assembly with which the transreflector is to be used.

Obviously many modifications and variations of the present invention are possible in the light of the above teachings. For example, while it is stated that the transreflector constructed by the present method reflects a vertically-polarized wave but passes a horizontally-polarized wave, the same transreflector, by merely being rotated 90°, can reflect a horizontally-polarized wave and pass a vertically-polarized wave. The principle that applies is that a wave which is propagated which is parallel to the wire of the grating will be reflected. Also, copper was mentioned as the material for the grating wire and other good current-carrying materials, such as gold, silver and platinum, can be used.

We claim:

1. A method of making a transreflector for a Cassegrain antenna comprising:

first making an elliptical-shaped grating of spaced parallel wires by winding with a lathe copper wire onto a flat mandrel having an elliptical hole substantially in the shape of the grating to be made;

then attaching said elliptical-shaped grating of spaced parallel wires to a sheet of flat plastic material;

then forming said sheet of plastic material with said grating attached thereto into a segment of a right circular cone having a parabolic end surface on which said spaced parallel wires are positioned; and then attaching said formed sheet of plastic material to a metallic mounting ring.